INVENTOR.
ROGER B. WHITE
BY
Meyer, Tilberry & Body
ATTORNEYS 3,437,858
SLOT WEDGE FOR ELECTRIC MOTORS
OR GENERATORS
Roger B. White, Cleveland, Ohio, assignor to The Glastic
Corporation, Cleveland, Ohio, a corporation of Ohio
Filed Nov. 17, 1966, Ser. No. 595,109
Int. Cl. H02k 3/98
U.S. Cl. 310—214                                14 Claims This invention pertains to the art of electric motors or generators and more particularly to a slot wedge for retaining the windings in the coil slots.

Slot wedges are elongated strips of electrically insulating material which are positioned across the open end of the coil slots of the stator or rotor of an electric motor or generator and retain the windings in such slots during operation. To hold the wedge in position, the sides of the slot adjacent the open end are provided with angled but inwardly facing surfaces and the edges of the wedge are tapered or beveled so as to conform to such angle.

In operation, slot wedges, particularly those on the rotor, are subjected to relatively high radial forces due to the centrifugal action urging the windings in the coil slot radially outwardly against the wedge. These forces create a shear stress in the edges of the slot wedge in a radial plane defined generally by the outermost corner of the angled surface, which plane will hereinafter be referred to as the "shear plane." Also these slot wedges are subjected to relatively high temperatures which, over a prolonged period of time, tend to cause a deterioration in the strength of electrically insulating materials used to make the wedge.

Heretofore slot wedges have been manufactured from a flat sheet of the desired thickness and of electrically insulating material made of a plurality of layers of fibrous paper or asbestos sheet material impregnated with a thermosetting resin such as phenol formaldehyde and cured so that the resin is hardened. This sheet is then cut into strips of the desired width and the edges of the strips machined to the desired bevel angle to fit the tooth lips.

Such slot wedges are generally expensive to manufacture due to the numerous machining operations. Also the filler and fibrous reinforcing materials used are highly abrasive to cutting tools making it necessary to frequently resharpen the tools and making the holding of close tolerances difficult. Another difficulty is that the machining exposes the ends of fibers on the surface so that oil and moisture can penetrate into the interior of the wedge by absorbtion or capillary action.

Further, these phenolic resin laminates have shear strengths, flex strengths and weight loss characteristics particularly at elevated temperatures which are inferior to the more expensive fiber reinforced polyester materials. Furthermore, the latter resins lend themselves admirably to a much more economical manufacturing process for the slot wedge wherein a plurality of parallel extending fibers, usually of glass, are impregnated with a liquid thermosetting polyester resin and then pulled through a heated open ended mold cavity of a cross-sectional shape exactly that of the desired cross-sectional shape of the ultimate slot wedge. While the polyester materials employed are somewhat more expensive, the reduction in the cost of manufacture and the ability to easily hold close tolerances more than offset the machining costs for the slot wedges made from flat stock. This process will be referred to hereinafter as a draw-molding or pull-trusion process. It is described in detail in United States Patent No. 2,818,606 issued Jan. 7, 1958, and assigned to the assignee of this application.

Tests on slot wedges so made indicated that while the flex strength and weight loss characteristics of the slot wedges were highly superior to that of the phenolic resin slot wedges, the shear strength was on the order of 5000 lbs. per linear inch while the slot wedge machined from the phenolic resin laminate was on the order of 9000 lbs. per linear inch. Analysis of the problem indicated that because the fibers ran exactly parallel to the shear plane, it was impossible to obtain the benefits of the shear strength of the fibers which, of course, is substantially higher than that of the resin itself.

The present invention contemplates a new and improved slot wedge which overcomes all of the above-referred to difficulties, has a shear strength in the edges substantially above that of the machined asbestos or paper reinforced phenolic resin type laminates, a higher flex strength and a reduced loss of flex strength and weight when subjected to elevated temperatures for long periods.

In accordance with the present invention, a slot wedge is provided which is made by the pull-trusion process and which is comprised of a hardened thermosetting resin impregnating and binding together a plurality of parallel extending fibers and including means along the entire length of the shear planes having a higher shear strength than parallel extending fibers in the plane of parallelism. Such means may take a number of different forms, e.g., a rod (or rods), ribbon (or ribbons) of metal or otherwise, woven glass tape (or tapes), and more preferably a cord (or cords) of spirally extending fibers. Thus in the area of high shear stress the slot wedge is reinforced while still retaining the flex strength of the longitudinally extending fibers intermediate or surrounding the means of high shear strength.

In the event a cord (or cords) is employed as a means of high shear strength, the cord may consist of a plurality of fibers known to have a relatively high transverse shear strength such as glass fibers or asbestos fibers twisted into a large diameter strand, which strand itself then forms a cord, or may consist of a plurality of such fibers twisted into smaller diameter strands and then a plurality of such strands twisted so as to form a cord. In either event the fibers forming the portion of the slot wedge in the shear plane instead of extending exactly parallel to such shear plane extend diagonally thereacross and thus the aggregate of the shear strength of all the fibers in the cord are in the shear plane resulting in a slot wedge having a much higher shear strength per linear inch than ever heretofore obtainable using the phenolic laminate type of slot wedge.

The principal object of the invention is the provision of a new and improved slot wedge which may be manufactured in a much more economical manner than slot wedges known heretofore and which will have highly improved shear strength, flex strength and weight loss characteristics at elevated temperatures.

Still another object of the invention is the provision of a new and improved slot wedge which may be manufactured by the pull-trusion techniques which will have high shear strength in the shear plane.

Another object of the invention is the provision of a new and improved slot wedge having means of high shear resistance in the shear plane thereof.

Another object of the invention is the provision of a new and improved slot wedge wherein the reinforcing fibers, even though pulled through a pull-trusion die, extend at an angle across the shear plane.

A further object of the invention is the provision of a new and improved slot wedge which for the same dimensions will have between 10% and 30% increase in the shear strength in the shear plane over slot wedges heretofore used.

Another object of the invention is the provision of a new and improved slot wedge which can be manufactured by the pull-trusion techniques and which has a shear strength in the shear plane greater than that of parallel extending fibers.

Another object of the invention is the provision of a slot wedge which can be manufactured at less cost than those heretofore employed.

Another object is the provision of a new and improved slot wedge which can be easily manufactured to closely hold tolerances.

Another object is the provision of a new and improved slot wedge which is molded to its ultimate cross sectional shape with closely held tolerances and need not be machined to such shape.

Another object is the provision of a new and improved slot wedge the surface of which is a film of plastic material and which surface has no exposed fiber ends.

The invention may take physical form in certain parts and arrangements of parts, preferred embodiments of which will be described in detail in this specification and illustrated in the accompanying drawing which is a part hereof and wherein.

Figure 2:
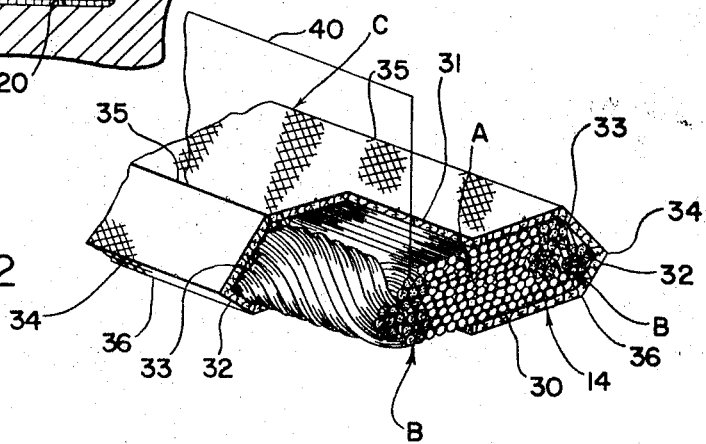
FIGURE 2 is an enlarged fragmentary perspective view of the slot wedge of FIGURE 1 showing in cross-section details of the fiber arrangement in the wedge.
Figure 4:
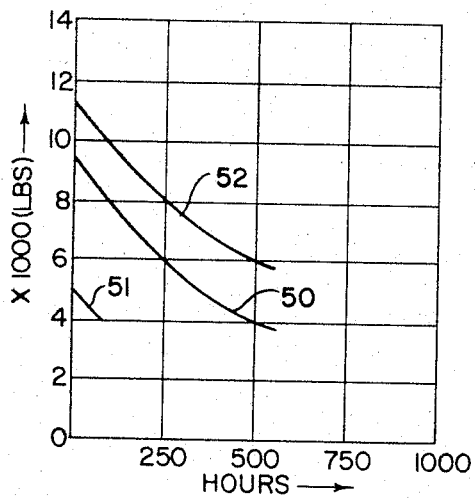
Figure 5:
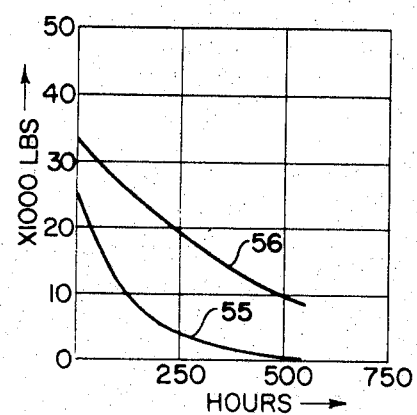
Figure 6:
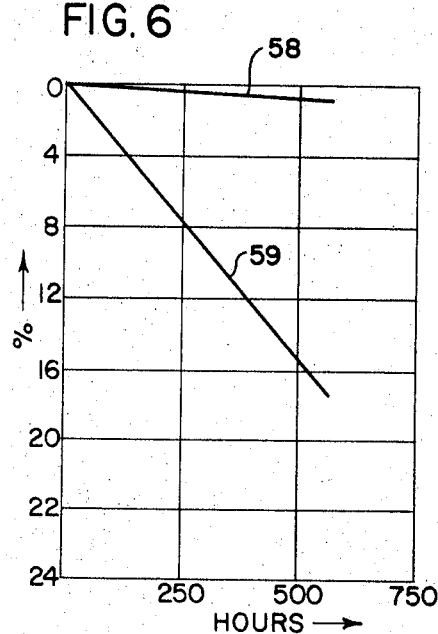
Figure 7:
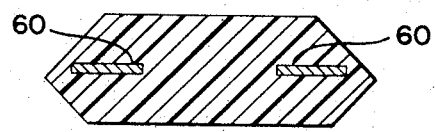
Figure 8:
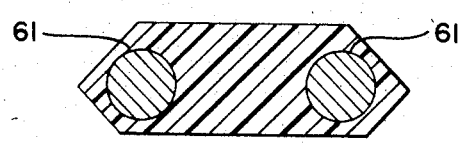

FIGURES 4, 5, and 6 are graphs showing the physical characteristics of the slot wedges of the prior art compared to the present invention both initially and after aging at 225° C. for 500 hours;

FIGURE 7 is a view similar to FIGURE 2 but showing an alternative embodiment of the invention; and, FIGURE 8 is a view similar to FIGURES 2 and 7 but showing a still further modified form of the invention.

Figure 1:
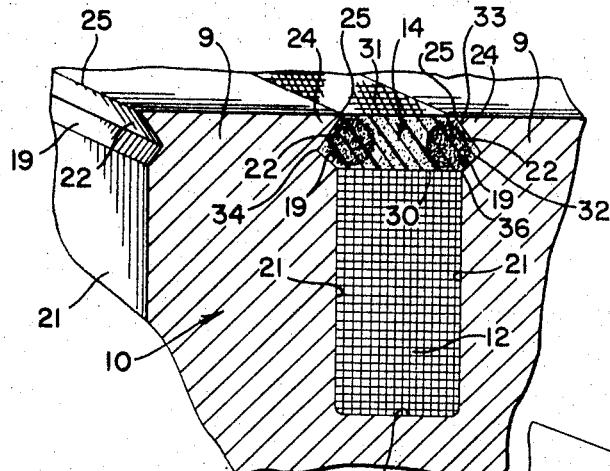
FIGURE 1 is a fragmentary cross-sectional perspective view of the rotor of an electric motor or generator having a slot wedge associated therewith illustrating a preferred embodiment of the invention.

Referring now to the drawings wherein the showings are for the purpose of illustrating preferred embodiments of the invention only and not for the purpose of limiting same, FIGURE 1 shows a fragmentary view of the rotor 10 of an electric motor or generator having axially and radially extending teeth 9 defining axially and radially extending coil slots having disposed therein coil windings 12 and at the outer end a slot wedge 14 constructed in accordance with the present invention.

The rotor construction is conventional and will not be described further herein other than to state that it is usually made up of a stack of magnetically permeable laminations each having a plurality of notches in the periphery thereof aligned with all of the other notches to form the coil slot. The coil slots are each defined by a base 20 and radially extending sidewalls 21 each of which have a notch at the outer edge thereof defined by a surface 19 which slopes outwardly and away from the sidewalls and a surface 22 which slopes outwardly toward the sidewall to form a tooth lip 24. The ends 25 of these lips define an elongated opening through which the coil winding 12 can be inserted into the slot.

The cross-sectional configuration and dimensions of the slot wedge 14 form no part of the present invention. In general, the slot wedge has a length equal to that of the coil slot and a total width such as to extend across the full width of the distance between the apices of the notches. The slot wedge shown has inner and outer flat parallel surfaces 30, 31 which surfaces respectively intersect with angularly disposed surfaces 32, 33 to form corners 36, 35. The surfaces 32, 33 in turn intersect to form a corner 34 forming the extreme longitudinally extending edges of the slot wedge 14.

The width and angle of the surfaces 33 form no part of the present invention but are generally made so as to properly conform to the width and angle of the surfaces 19, 22. After the windings are placed in the coil slots, the wedge 12 is forcefully driven axially into the notches.

In operation of the motor or generator, the coil winding 12 is urged radially outwardly by centrifugal action and the forces generated are transferred to the slot wedge 14 and then to the teeth 9 by a pressure engagement between the surfaces 33 and 22. The forces create a shear stress in the slot wedge 14 running parallel to but spaced from the edges 34. While this shear stress may exist over a substantial width of the slot wedge 14, it appears to be primarily concentrated in a substantially radial shear plane 40 extending through and intersecting with the extreme end 25 of the tooth lip 24.

The construction of the slot wedge 14 in accordance with the invention is such as to provide a maximum shear strength in the slot wedge in this shear plane.

The slot wedge may have any dimension to fill the slot design but one embodiment tested successfully has a thickness of $\frac{3}{16}$ inch (4.7 mm.), a maximum width of $1\frac{7}{64}$ inch (3.1 mm.), and the distance between corners 35 is approximately $\frac{5}{32}$ inch (5.5 mm.). The distance from corner 34 to the shear plane is thus approximately $\frac{3.5}{64}$ inch (3.8 mm.). The angle of surface 35 to the shear plane is approximately 40°.

In the embodiment shown in FIGURE 2, the slot wedge is made up of three principal sets of fibers all bound together into a solid mass by a hardened thermosetting resin. Thus the slot wedge may be said to be made up of a central portion A, edge portions B and a cover portion C which may or may not be employed as desired.

The portion A can be comprised as desired but in the embodiment shown is made up of a plurality of tightly compacted strands of fiber. These fibers are straight and parallel to each other and the corners 34. These fibers may be of any desired specification but in the embodiment tested are a 60 end roving of "G" filament diameter glass fiber.

The portion C is made up of a woven tape wrapped around the portions A and B and the degree of wrap will depend upon the width of tape employed. Usually a wrap of about 1¼ times is preferred although the number of wraps of this tape around the slot wedge forms no part of the present invention. This tape gives the wedge a high transverse bending strength making it possible to exert substantial longitudinal pressure on the wedge when it is being inserted into the notches. Also it contributes to the shear strength because approximately one half the fibers are transverse to and extend across the shear plane. It may be of any desired type, e.g., 5–30 mils woven glass tape, but in the embodiment tested is a 15 mil woven glass fiber tape.

The parallel extending glass fibers, even though bound together by a hardened thermosetting resin, have insufficient shear strength in a plane parallel to the length of the fibers. Thus the portions B of the slot wedge 14 are made up of means having a shear strength higher than the shear strength of the parallel extending fibers in a plane parallel to the length of such fibers. Such means may take a number of different forms but in the embodiment shown in FIGURE 2 is made up of a cord of fibers which in and of themselves have a shear strength in a plane across their longitudinal length substantially greater than the shear strength parallel to the longitudinal length. The fibers of this cord may be as desired, e.g., nylon, asbestos, glass fiber, metal, wire or the like, but in the preferred embodiment the fibers are glass fibers. The cord may take a number of different forms, but in the preferred embodiment has a diameter large enough so as to insure that at least a portion of the diameter of the cord will extend across the shear plane 40. Thus normally the diameter of the cord will be at least greater than the distance between the edge 34 and the shear plane 40. In the preferred embodiment the cord has a diameter just less than the thickness of the slot wedge.

Figure 3:
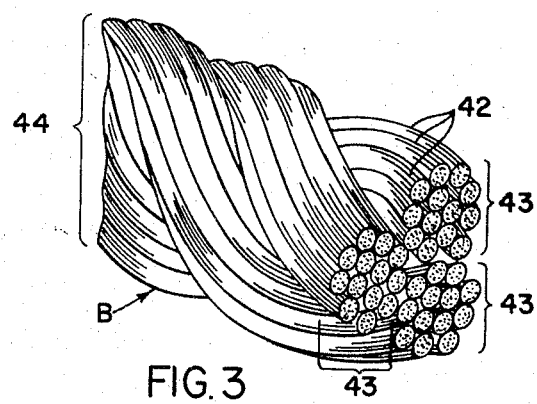
FIGURE 3 is a view similar to FIGURE 2 but showing details of the fibrous material without the binding plastic material.

The cord making up the portion B may consist of a plurality of fibers twisted or braided into a single large diameter strand or as shown in FIGURE 3, may consist of a plurality of fibers 42 twisted into smaller diameter strands 43 and then a plurality of such strands being twisted into a cord 44 of the desired diameter. Preferably the cord is a ⅛ inch diameter glass fiber cord made up of three strands twisted to six turns per inch of length.

Because of the twist or helical configuration of the filaments and strands, it will be noted that each filament and each strand always extends at an angle across the shear plane 40. Thus the shear strength in the shear plane 40 is provided by the strands of the cord B rather than the strength of the hardened thermosetting resin.

It will be appreciated that the cord may make up more of the portion A. Inasmuch as the cord is more expensive than roving, the construction shown is preferred.

The resin is a conventional polyester thermosetting resin containing a benzoyl peroxide catalyst and a filler pigment.

The slot wedge shown may be manufactured in a number of different ways but preferably is manufactured by what is known as the "pull-trusion technique," namely, of providing a heated mold cavity open at both ends and having a cross-sectional configuration identical to the desired cross-sectional configuration of the slot wedge. A pair of cords as above described are advanced in spaced parallel relationship into the edges of the mold cavity. In the space between the pair of cords there are a plurality of glass fiber strands. The cords and the glass fiber strands prior to entering the mold cavity pass through a bath of liquid thermosetting resin until they are thoroughly impregnated therewith. After leaving the bath, the impregnated cord and glass fibers are progressively wrapped with a glass fiber woven tape just prior to their entry into the entrant end of the mold cavity. Excess resin is squeezed out by the entrant end of the mold and the fibers are tightly compacted. As the impregnated mass passes through the heated mold cavity, the liquid resin cures and hardens. The entire mass is moved through the mold cavity by pulling on the slot wedge with the resin now hardened as it emerges from the exit end of the mold cavity. The rods so formed are then cut to length.

The side surfaces of the slot wedge so formed are a thin layer of hardened resin overlaying and sealing the fibers of the tape C from moisture and oils. The surface may be defined as being hardened resin in the as-cast condition and may be distinguished from the machined laminates where the side surfaces are machined and are made up of many exposed fiber ends.

Referring now to FIGURE 4, curve 50 shows the shear strength of a machined phenolic resin laminate approximately 9500 lbs. per inch of length which deteriorates to 4000 lbs. per inch of length after 500 hours at 225° C. Curve 51 shows the shear strength of a polyester type resin having glass fibers extending parallel to the shear plane to be approximately 5000 lbs. per inch of length.

Curve 52 shows the shear strength of the preferred embodiment to be in excess of 11,000 lbs. per inch of length which decreases to approximately 6000 lbs. per inch of length after aging at 500 hours at 225° C.

Curve 55 of FIGURE 5 shows the initial flex strength of phenolic resin laminate to be approximately 20,000 lbs. which decreases to almost zero after 500 hours while curve 56 shows the slot wedge of the present invention to have an initial flex strength in excess of 30,000 lbs. which decreases to 10,000 lbs. after aging for 500 hours.

Curve 58 of FIGURE 6 shows that the weight loss of the slot wedge of the present invention was practically zero after 500 hours while curve 59 shows the machined phenolic resin had a weight loss in excess of 16%.

FIGURE 7 shows an alternative embodiment of the invention wherein the means for increasing the shear strength in the shear plane rather than being a cord of fibers is instead a pair of elongated ribbons 60 of metal such as steel, brass, or aluminum. Such ribbons may have any desired thickness but preferably is a ribbon between 0.005–0.0010 inch. The ribbons each have a width sufficient to extend across the shear plane. For a slot wedge having a width of 17/64 inch, the width of each ribbon is at least ⅛ inch. These ribbons could be made integral. If so, they should be perforated in the A area so that the top and bottom of the wedge are united by plastic in the perforations.

FIGURE 8 shows a still further alternative embodiment wherein the means for increasing the shear strength in the shear plane is a pair of rods 61 of metal or other material each having a diameter such as to extend across the shear plane.

The invention has been described with reference to preferred embodiments. Obviously modifications and alterations will occur to others upon a reading and understanding of this specification, and it is my intention to include all such modifications and alterations insofar as they come within the scope of the appended claims.

Having thus described my invention, I claim:

1. A slot wedge adapted to be positioned in a coil slot of an electric motor or generator wherein the outer portions of the slot sidewalls each have an inwardly facing surface forming a tooth lip therebeyond, the extreme ends of which lips each define a radially extending shear plane, said wedge having a width greater than the distance between said planes and having edges defined by angled surfaces to mate with the inwardly facing surfaces, the improvement which comprises: a pair of spaced portions one in each of the shear planes and an intermediate portion, said intermediate portion being comprised of a plurality of fibers bound together by a hardened thermosetting resin, said fibers and resin having a low shear strength, said spaced portions being comprised of means having a substantially higher shear strength and being integrally bound to said intermediate portion by said resin.

2. The improvement of claim 1 wherein said means are comprised of a plurality of helically extending fibers.

3. The improvement of claim 2 wherein said fibers are glass.

4. The improvement of claim 1 wherein said means are a cord of glass fibers.

5. The improvement of claim 4 wherein said wedge has a thickness less than the width and said cord has a diameter approximately the same as the wedge thickness.

6. The improvement of claim 5 wherein the shear plane is spaced approximately one-half the wedge thickness from the extreme edge of said wedge.

7. The improvement of claim 1 wherein said wedge has an outer portion comprised of woven tape integrally bound to said other portions by said resin.

8. The improvement of claim 2 wherein said wedge has an outer portion of woven tape integrally bound by said resin to said other portions and said surface is hardened resin in the as-cast condition.

9. The improvement of claim 1 wherein said means is comprised of a solid member.

10. The improvement of claim 9 wherein said member is a metal ribbon.

11. The improvement of claim 9 wherein said member is a rod.

12. The improvement of claim 11 wherein said rod is metal.

13. A slot wedge adapted to be positioned in a coil slot of electric motor or generator wherein the outer portions of the slot sidewalls each have an inwardly facing surface forming a tooth lip therebeyond, the extreme ends of which lips each define a radially extending shear plane, said wedge having a width greater than the distance between said planes and having edges defined by angled surfaces to mate with the inwardly facing surfaces, the improvement which comprises: a pair of spaced portions one in each of the shear planes and an intermediate portion, said spaced portions being comprised of a plurality of helically extending fibers extending across the shear plane and bound together by a hardened thermosetting resin.

14. The improvement of claim 13 wherein the outer surface of said wedge is comprised of a woven glass tape bound to said fibers by said resin.

References Cited

UNITED STATES PATENTS

| | | | |
|---|---|---|---|
| 984,182 | 2/1911 | Barr | 310—214 |
| 2,990,487 | 6/1961 | Stigler | 310—214 |
| 3,009,073 | 11/1961 | Drabik | 310—214 |

WARREN E. RAY, *Primary Examiner.*

R. SKUDY, *Assistant Examiner.*